United States Patent [19]

Hilbrands

[11] Patent Number: 5,067,285
[45] Date of Patent: Nov. 26, 1991

[54] SEAL BELT ASSEMBLY FOR COMPARTMENTS IN WHICH BLASTING, SPRAYING AND THE LIKE OPERATIONS ARE PERFORMED

[75] Inventor: Martin J. Hilbrands, Grand Rapids, Mich.

[73] Assignee: Progressive Blasting Systems, Inc., Grand Rapids, Mich.

[21] Appl. No.: 509,957

[22] Filed: Apr. 16, 1990

[51] Int. Cl.⁵ .............................................. B04C 9/00
[52] U.S. Cl. ...................................... 51/426; 51/268; 118/326; 118/DIG. 7
[58] Field of Search ................... 51/410, 417, 421, 426, 51/268, 269, 271, 272, 274; 160/133, 264, 231.1; 474/144; 49/128; 384/15; 134/172; 220/350, 2.5, 380, 626, DIG. 9, 420, 421, 425; 118/326, DIG. 7

[56] References Cited

U.S. PATENT DOCUMENTS

| | | |
|---|---|---|
| 1,845,908 | 2/1932 | Cover . |
| 3,415,131 | 12/1968 | Zieber . |
| 4,027,715 | 6/1977 | Tohma .......................... 160/231.1 X |
| 4,445,958 | 5/1984 | Jaksha ............................ 160/133 X |
| 4,628,646 | 12/1986 | Eyerle ............................ 160/133 X |
| 4,723,378 | 2/1988 | VanKuiken, Jr. et al. . |
| 4,882,881 | 11/1989 | VanKuiken, Jr. et al. . |

*Primary Examiner*—D. S. Meislin
*Attorney, Agent, or Firm*—Price, Heneveld, Cooper, DeWitt & Litton

[57] ABSTRACT

A seal belt assembly for a robot mechanism for continuously covering the open top of a cabinet in which an operative device is moved along a rectilinear axis between two opposite sides of the cabinet. The belt assembly provides a belt that is sufficiently strong to sustain the weight of a worker thus avoiding injury to a worker who might accidentally step on the belt, and also provides a sound barrier reducing the noise generated in the cabinet from passing through the ceiling.

8 Claims, 3 Drawing Sheets

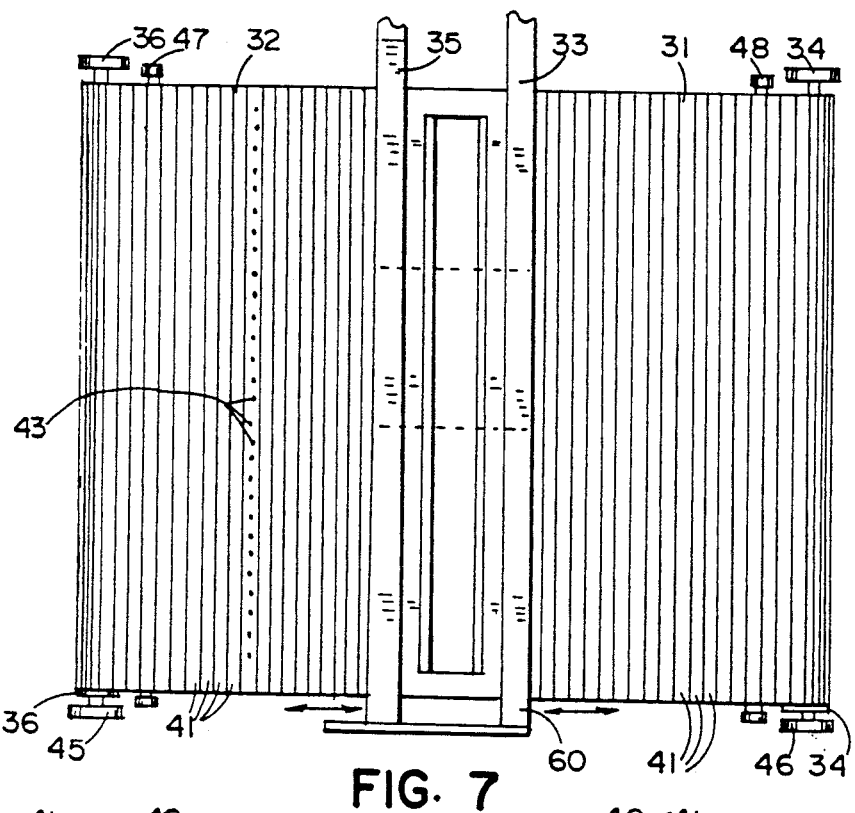
FIG. 7
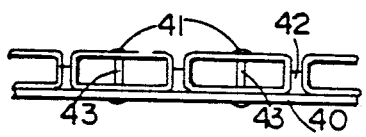
FIG. 11
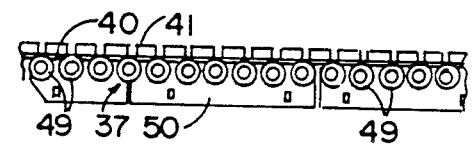
FIG. 12
FIG. 8
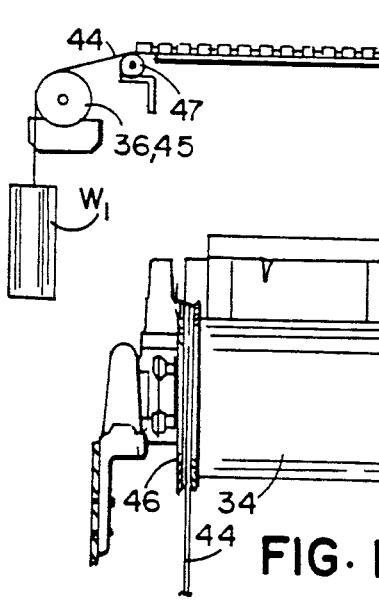
FIG. 10
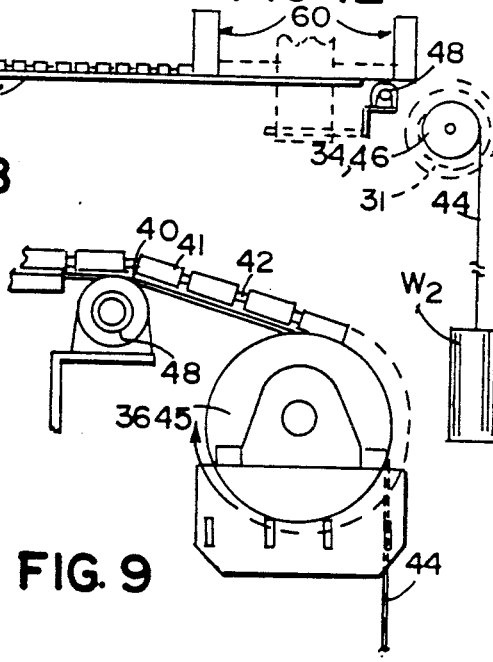
FIG. 9

SEAL BELT ASSEMBLY FOR COMPARTMENTS IN WHICH BLASTING, SPRAYING AND THE LIKE OPERATIONS ARE PERFORMED

BACKGROUND OF THE INVENTION

This invention relates to a seal belt assembly utilized for closing off the top of a compartment or cabinet in which operations are performed on workpieces within the compartment or cabinet. There are many operations, such as blasting and spraying, which are performed in relatively large compartments or cabinets in which the operative device for conducting such spraying or blasting is controlled by a robot that moves across the top of the compartment. In one of these types of apparatus, as disclosed in U.S. Pat. No. 4,882,881 entitled ROBOT POSITIONER AND SEAL ARRANGEMENT FOR A CLOSED CHAMBER, a seal belt is used attached to a carriage which supports a mast which extends downwardly into the compartment or cabinet. The operative device that does the blasting or spraying is mounted at the lower end of the mast. In the operation of such devices, the atmosphere within the compartment becomes filled with undesirable material that has to be prevented from escaping from the compartment. The apparatus of U.S. Pat. No. 4,882,881 includes a belt secured to the longitudinal sides of the carriage and continuously covering the top of the compartment. Although this belt has a decided advantage for containing the polluted air within the compartment, it has a safety hazard and also the noise transmitted through the ceiling by the operative device within the compartment is very undesirable.

In apparatus of the above type, it is essential that a catwalk be provided along one of the sides and above the top of the compartment or cabinet for maintaining the robot equipment located above the cabinet. Thus, a hazard exists that a worker in making repairs on the equipment could accidentally step on the belt, which appears to be rigid and sufficiently strong to sustain a person's weight, but which is not. Thus, the safety hazard referred to above exists in such prior art apparatus. Further, prior belts do not contain the noise generated by the operating device within the cabinet. The present invention solves this problem as will be described hereinafter.

SUMMARY OF THE INVENTION

In accordance with this invention, the belt is provided with a plurality of elongated elements attached thereto and extending parallel to the elongated carriage. The elongated elements, preferably constructed of metal such as thin wall steel or aluminum tubing, are supported at their ends as the belt slides along such supports. Such construction has solved the safety problem since the tubing is sufficiently strong to sustain the weight of a worker who might accidentally step on the belt.

Within a preferred form of this invention, I provide a noise barrier between each of the elongated tubes. This preferably takes the form of a foam filler material. The tubing and the foam filler material provides a substantial sound barrier that reduces the noise created by the operative device within the compartment from passing upwardly through the ceiling and to the area surrounding the compartment or room.

The present invention thus provides a unique construction for a seal belt that provides sufficient strength to sustain at least for a time the weight of a normal worker and also provides a sound barrier that retains the noise within the compartment.

BRIEF DESCRIPTION OF THE DRAWINGS

FIG. 7 is a plan view of the seal belt assembly of this invention;

FIG. 8 is a slightly enlarged side-elevational view of the seal belt assembly of this invention;

FIG. 9 is an enlarged, partial, side-elevational view of one end of the seal belt assembly;

FIG. 10 is an enlarged, partial, end-elevational view of one of the end corners of the seal belt assembly;

FIG. 11 is an enlarged, cross-sectional view of the belt;

FIG. 12 is an enlarged, partial cross-sectional view of the side support means for the belt.

BRIEF DESCRIPTION OF THE PREFERRED EMBODIMENT

Figure 1:
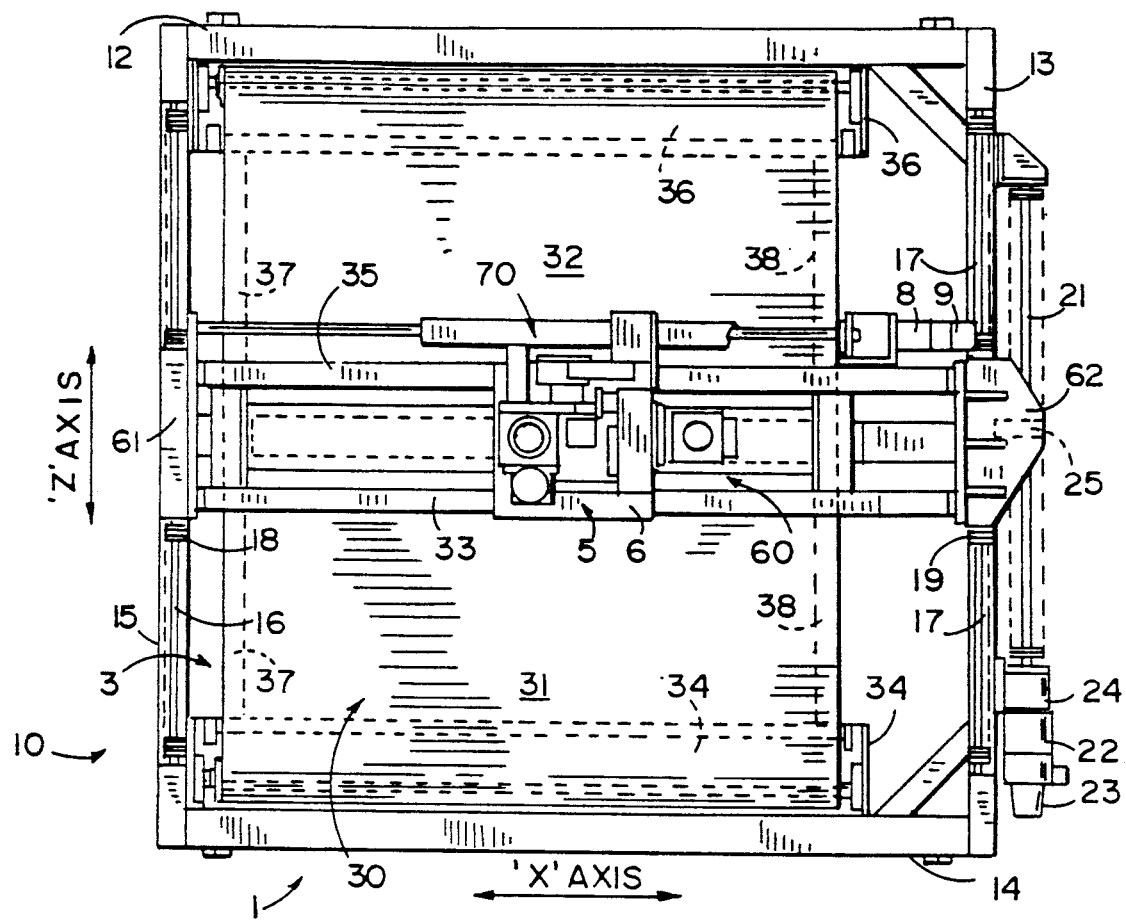
FIG. 1 is a plan view of the belt assembly of this invention in combination with the robot mechanism with which it is used.
Figure 2:
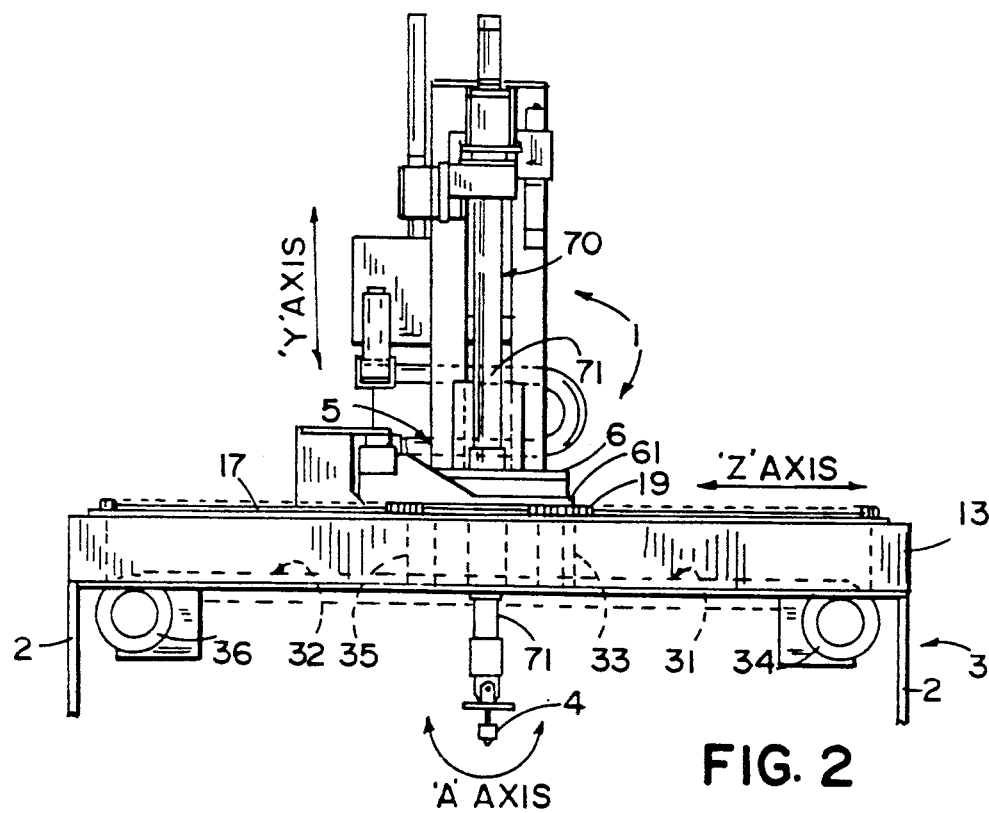
FIG. 2 is a side-elevational view of the belt assembly and robot mechanism as disclosed in FIG. 1.
Figure 3:
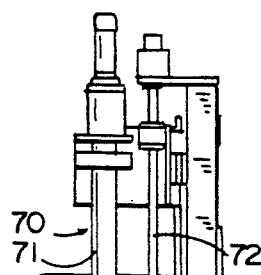
FIG. 3 is an end-elevational view of the mechanism of FIGS. 1 and 2.
Figure 4:
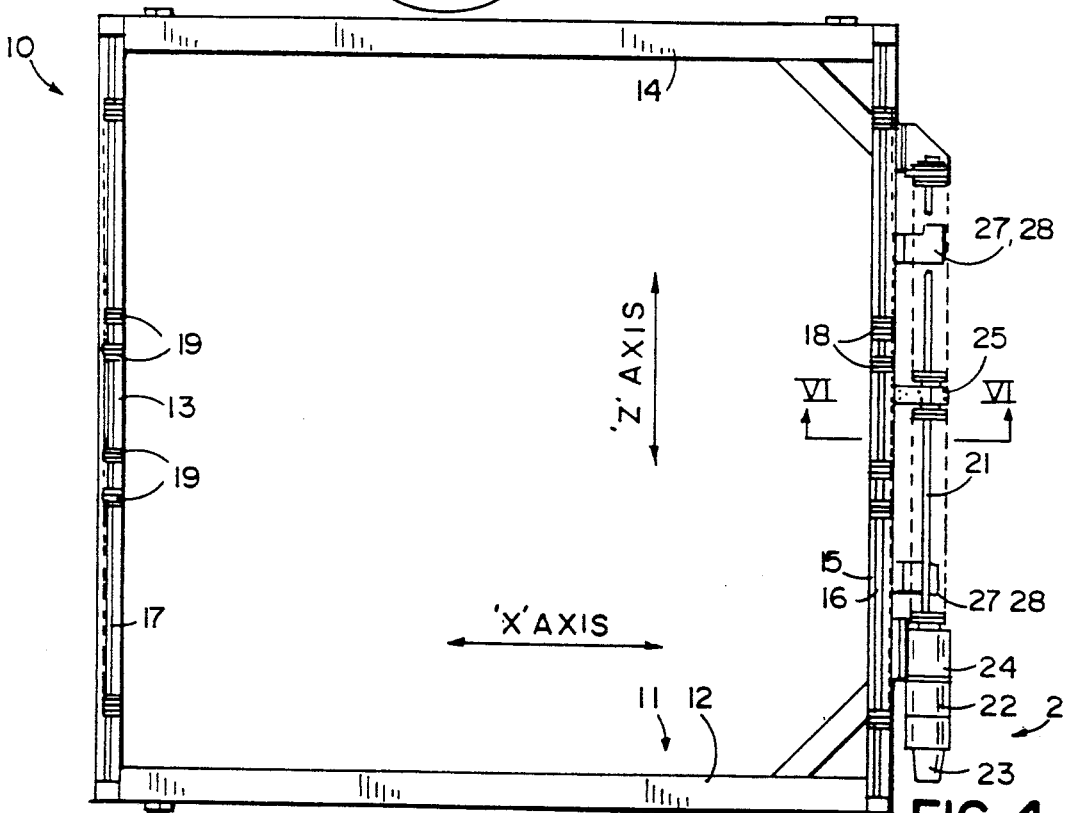
FIG. 4 is a plan view of a robot base subassembly performing a part of the robot mechanism on which the belt mechanism assembly of this invention is mounted.
Figure 5:
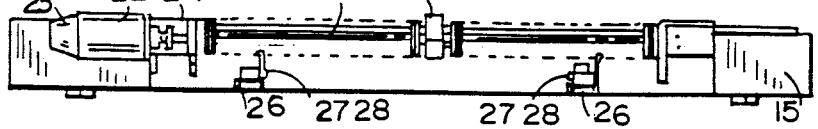
FIG. 5 is a side-elevational view of the mechanism of FIG. 4.

Referring to the drawings, FIGS. 1, 2 and 3 disclose the overall combination of the various subassemblies which make up the mechanism 1 which is shown mounted on the top of the walls 2 of a compartment, cabinet 3 in which is located the workpiece to be operated on. The entire mechanism 1 is a five-axis robot, the details of which are disclosed in greater detail in U.S. patent application Ser. No. 509,945, filed Apr. 16, 1990, and owned by the assignee of this application. The robot mechanism 1 provides for movement of the operative device 4 along the "X" axis and "Z" axis as designated in FIG. 1, the "A" and "Y" axes as designated in FIG. 2 and the "B" axis as designated in FIG. 3. The entire assembly includes a robot base subassembly 10 which provides for movement of carriage assembly 60 along the rectilinear "Z" axis. Rectilinear movement along the "X" axis is provided by means of a cart subassembly 5 on carriage assembly 60. Movement along the "Y" rectilinear axis and the "A" and "B" rotational axes is provided by means of the mast assembly 70. The present invention relates to the seal subassembly 30 which will be described in relation to the base subassembly 10 and the carriage assembly 60.

The base subassembly 10 is constructed of a rectangular frame 11 of the same size and shape as the top of the cabinet 3. This frame is constructed of the side members 12, 13, 14 and 15. Side members 12 and 14 are mounted on the top of the opposite walls of the cabinet while frame members 13 and 15 are also mounted on opposite walls of the cabinet. The side members 13 and 15 support guide tracks 16 and 17 on which are slidably mounted the blocks 18 and 19 on which the carriage assembly 60 is mounted by means of the end plates 61 and 62 (FIG. 1). The guide tracks 1 and 17 and blocks 18 and 19 permit the movement of the carriage assembly 60 along the "Z" axis.

An actuating subassembly 20 is provided for the purpose of actuating or moving the carriage subassembly along the guide tracks 16 and 17. This actuating subassembly 20 includes a ball screw 21 driven by a motor 22 the operation of which is controlled by the encoder 23. A accordion type boot 21a covers ball screw drive. A flex coupling 24 is provided between ball screw 21 and motor 22. A ball nut subassembly 25 is engaged and driven by the ball screw 21 which is secured to the bracket 62.

Figure 6:
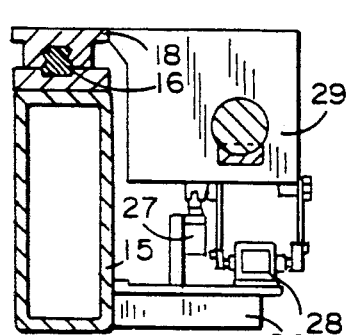
FIG. 6 is a cross-sectional view taken along the plane VI—VI of FIG. 4.

As disclosed in FIG. 6, near each end of the side member 16 is located a bracket 26 supporting the home switch 27 and limit switch 28 provided to control the operation of the motor 23 by stopping it when the carriage and cart assembly reach the limit of its travel along the guide rails 16 and 17. These two switches are actuated by an actuator plate 29 attached to the support bracket for the ball nut 25.

The carriage subassembly 60 supports the cart 5 which includes support plate 6, as disclosed in FIG. 1 and 2, which in turn supports the mast assembly 70 for movement along the "X" axis on parallel rail supports (not shown) but which is disclosed in detail in the co-pending application Ser. No. 509,945, filed Apr. 16, 1990, entitled FIVE-AXIS ROBOT.

The mast support plate 6 is driven along the "X" axis by the ball screw 7 driven by the motor 8. An encoder 9 is provided to control the operation of the motor 8.

The novelty of the present invention resides in the seal belt subassembly 30 which includes the two sections 31 and 32. Seal belt section 31 is connected to the side member 33 and to the roller 34 while the seal belt section 32 is secured to the side member 35 and the roller 36. The side edges of the belt sections 31 and 32 ride on the support surfaces 37 and 38.

FIGS. 7-11 disclose in greater detail the seal belt subassembly in which the carriage assembly 60 is schematically shown for reference purposes only, the reference numerals 33 and 35 designating the side members to which the sections 31 and 32 are respectively connected. As disclosed in FIG. 11, the sections 31 and 32 are each composed of the belt 40 to which are attached the elongated tubular members 41 constructed of thin wall steel between which are sandwiched the foam filler 42. It should be understood that tubular members 41 can be constructed of different material than thin wall steel which was selected because of its relatively light weight and sufficient strength to sustain for at least some time the weight of a worker that might accidentally step on the seal belt. Filler 42 can also be a different material so long as it is flexible and provides a sound barrier. As previously disclosed, the combination of the tubular members 41 and the plastic foam material 42 provides a sound barrier that greatly reduces the transmission of sound through the ceiling of the room, compartment or cabinet. The tubes 41 are secured to the belt 40 by fastener means 43 such as rivets or the like, as illustrated in FIG. 11. Such fastener means 43 are spaced along the tubes 41 as illustrated by one of the tubes of FIG. 7.

As previously referred to, the belt section 31 is connected to the roller 34 and belt section 32 is connected to the roller 36. This construction is best shown by FIGS. 8, 9 and 10. Referring to FIG. 8, it discloses the seal belt fully retracted with the section 31 rolled onto the roller 34 and with the carriage assembly moved to a position to the extreme right. In this position, section 32 is covering the open ceiling of the cabinet or compartment 3. In this position, the belt sections 32 and 33 are held taut by weights W1 and W2 attached to the cable 44 passing over the pulley 45, it being understood pulleys 46 and 45 are located at the ends of the rollers 34 and 36 (FIG. 10). The cables 44 are attached to the belt and the pulleys 45 and 46 are located outwardly of the roller 36 so as not to interfere with the belt as it rolls on and off of the roller 34. Guide rollers 47 and 48 are located at opposite ends of the belt assembly so as to guide the belt as disclosed in FIG. 9.

FIG. 12 discloses the construction of the side supports 37 and 38 which comprise a series of rollers 49 mounted on the support 50. The rollers 49 reduce the friction exerted on the belt.

It should be understood that this invention of a seal belt assembly can be utilized with many different types of robot mechanisms. I have disclosed only one type which includes the mast assembly 70 which has a mast 71 that moves up and down along the "Y" axis and also provides for movement on the rotational "A" axis (FIG. 2) and the rotational "B" axis (FIG. 3) all of which is disclosed in detail in my copending application Ser. No. 509,945, filed Apr. 16, 1990 and entitled FIVE-AXIS ROBOT.

OPERATION

Having disclosed my invention in detail above, the operation of this invention should be evident. As previously described, movement of the operative device 4 is provided by the movement of the carriage assembly 60 on the rails 16 by the ball nut 25 which is driven by the ball screw 21 which in turn is driven by the motor 22. Movement of the operative device 4 along the "X" axis is provided by cart 6 driven by the ball screw 7 which in turn is driven by the motor 8 controlled by the encoder 9. The movement of the operative device along the linear axis "Y" and the rotational axes "A" and "B" is provided by the mast assembly 70 and particularly the mast 71, all as described in the above mentioned co-pending application.

In accordance with this invention, the seal belt subassembly 30 which comprises the two sections 31 and 32 moves with the carriage assembly 60 to continuously cover the opening in the top of the compartment or cabinet 2. When moving in one direction toward either of the side members 12 or 14, the portions of the sections which extend over the opening in the cabinet are either reduced or increased. For example, when the carriage assembly 60 moves to the right as viewed in FIG. 8, that is, towards the side member 14, the section 31 of the belt wraps around the roller 34. This is caused by means of a weight W2 which is attached to the cable 44 that rotates roller 34 causing the belt to be wound on the roller 34. When the carriage assembly 60 moves to the left as viewed in FIG. 8, the weight W1 causes the belt section 32 to be wound on the roller 36.

It should also be evident from the above description that the belt assembly of this invention composed of the belt 40, the hollow aluminum tubes 41 and the foam filler 42 provides for a relatively rigid and strong cover for the top of the cabinet 3 to at least substantially reduce any injuries that may be caused by a worker accidentally stepping on the belt. Further, the belt provides an extremely good noise barrier so that the annoying noise created by the operative device within the cabinet 2, will be substantially restrained.

Although a preferred embodiment has been disclosed herein, it should be understood that other modifications and embodiments can be utilized without departing from the spirit of this invention. Therefore, this invention should not be limited to only the embodiment illustrated which has been described as an example only.

The embodiments of the invention in which an exclusive property or privilege is claimed are defined as follows:

1. Apparatus for treating an object within an entirely enclosed compartment having enclosed sides and an enclosed ceiling covering the top of said compartment including an operative device manipulated by a robot manipulator means having an elongated mast extending downwardly through the ceiling of said compartment and supporting said device at its lower end for movement within said compartment;

means for enclosing said ceiling in which said manipulator means adjusts the mast during such treatment and while it is extending through said ceiling, such adjustment being in directions at least along a given axis;

said manipulator means including an elongated carriage assembly extending in a direction orthogonal to said given axis and spanning the distance between first and second parallel sides of said compartment; means for causing said carriage to move along said given axis between third and fourth compartment sides extending between said first and second compartment sides;

a seal belt subassembly connected to the longitudinal sides of said carriage and extending over said top of said compartment to said third and fourth sides, whereby as said carriage moves, said seal belt subassembly covers the openings in the compartment top between said carriage and third and fourth sides; the improvement comprising:

said seal belt subassembly including a flexible belt material with a plurality of rigid elongated members attached to said belt material and extending between said first and second sides; said rigid elongated members providing support for said flexible belt, to prevent said belt from sagging, said members providing a noise restraining means, and said members having means to sustain the weight of a worker to provide a safety feature should a worker accidentally step on said seal belt subassembly.

2. The apparatus of claim 1 in which the rigid elongated members are arranged substantially parallel to each other and adjacent ones of said members are closely spaced.

3. The apparatus of claim 2 in which resilient filler elements are located between said adjacent elongated members to fill the space therebetween to assist in restraining the noise created inside the compartment from passing through said belt assembly.

4. The apparatus of claim 2 in which the rigid elongated members are light weight metal tubes.

5. The apparatus of claim 3 in which the rigid elongated members are light weight metal tubes.

6. The apparatus of claim 3 in which the filler elements are constructed of a foam material.

7. The apparatus of claim 1 in which a roller and pulley combination is provided adjacent the tops of each third and fourth wall, said belt assembly riding on each of said rollers and a cord means connected to said belt assembly and passing over each of said pulleys for pulling said belt assembly and rotating said roller.

8. The apparatus of claim 7 in which a weight means is secured to said cord means for keeping said seal belt subassembly taut as said carriage moves from one side to another along said given axis.

* * * * *

UNITED STATES PATENT AND TRADEMARK OFFICE
CERTIFICATE OF CORRECTION

PATENT NO. : 5,067,285
DATED : November 26, 1991
INVENTOR(S) : Martin J. Hilbrands It is certified that error appears in the above-identified patent and that said Letters Patent is hereby corrected as shown below:

Column 3, line 1:
"tracks 1 and 17" should be
--tracks 16 and 17--.

Signed and Sealed this

First Day of June, 1993

Attest:

MICHAEL K. KIRK

*Attesting Officer*   *Acting Commissioner of Patents and Trademarks*